United States Patent
Guzik et al.

(10) Patent No.: US 12,094,493 B2
(45) Date of Patent: Sep. 17, 2024

(54) AUTOMATED CLASSIFICATION AND INDEXING OF EVENTS USING MACHINE LEARNING

(71) Applicants: Getac Technology Corporation, Taipei City (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, Taipei (TW); WHP Workflow Solutions, Inc., North Charleston, SC (US)

(*) Notice: Subject to any disclaimer, the term of this patent is extended or adjusted under 35 U.S.C. 154(b) by 0 days.

(21) Appl. No.: 17/328,960

(22) Filed: May 24, 2021

(65) Prior Publication Data

US 2022/0375501 A1    Nov. 24, 2022

(51) Int. Cl.
| | |
|---|---|
| *G11B 27/10* | (2006.01) |
| *G06F 16/41* | (2019.01) |
| *G06N 20/20* | (2019.01) |
| *G11B 27/34* | (2006.01) |
| *G06V 20/40* | (2022.01) |

(52) U.S. Cl.
CPC ............ *G11B 27/102* (2013.01); *G06F 16/41* (2019.01); *G06N 20/20* (2019.01); *G11B 27/34* (2013.01); *G06V 20/41* (2022.01); *G06V 20/44* (2022.01)

(58) Field of Classification Search
CPC ...... G11B 27/102; G11B 27/34; G06N 20/20; G06F 16/41; G06K 9/00718; G06K 2009/00738
See application file for complete search history.

(56) References Cited

U.S. PATENT DOCUMENTS

| | | | | |
|---|---|---|---|---|
| 2004/0268224 A1* | 12/2004 | Balkus | ................. | G11B 27/105 715/204 |
| 2014/0072284 A1* | 3/2014 | Avrahami | ............ | G11B 27/031 386/E5.028 |
| 2014/0198216 A1 | 7/2014 | Zhai et al. | | |

(Continued)

FOREIGN PATENT DOCUMENTS

| | | |
|---|---|---|
| JP | 2009070026 A | 4/2009 |
| KR | 20170141049 A | 12/2017 |
| WO | 2020172414 A1 | 8/2020 |

OTHER PUBLICATIONS

U.S. Appl. No. 17/373,091, Office Action mailed Apr. 27, 2022, 30 pages.

(Continued)

*Primary Examiner* — Daniel T Tekle
(74) *Attorney, Agent, or Firm* — Henderson Finnegan; Farabow, Garrett & Dunner, L.L.P.

(57) ABSTRACT

Described herein are techniques that may be used to automatically identify and index events within a media content file. Such techniques may comprise receiving, from at least one recording device, a media content, receiving sensor data determined to correspond to the media content, determine a context associated with the at least one recording device based on the sensor data, identifying, based on one or more data patterns detected within the sensor data and based on the contextual data, at least one event, generating an index corresponding to the identified event, and storing an indication of the generated index in association with the media content.

20 Claims, 6 Drawing Sheets

(56) References Cited

U.S. PATENT DOCUMENTS

| | | | |
|---|---|---|---|
| 2015/0078727 A1 | 3/2015 | Ross et al. | |
| 2016/0035391 A1 | 2/2016 | Ross et al. | |
| 2016/0314818 A1 | 10/2016 | Kirk et al. | |
| 2016/0349019 A1 | 12/2016 | Phillips et al. | |
| 2017/0142214 A1* | 5/2017 | Nanavati | H04L 67/53 |
| 2018/0063421 A1 | 3/2018 | Yokomitsu | |
| 2018/0158265 A1 | 6/2018 | Lyman et al. | |
| 2019/0356885 A1 | 11/2019 | Ribeiro et al. | |
| 2019/0392215 A1 | 12/2019 | Hagio et al. | |
| 2020/0344301 A1 | 10/2020 | ElHattab et al. | |
| 2021/0026881 A1* | 1/2021 | Nakabayashi | G06F 16/55 |
| 2021/0124741 A1* | 4/2021 | Acharya | G06Q 50/10 |
| 2022/0303455 A1 | 9/2022 | Park et al. | |

OTHER PUBLICATIONS

International Patent Application No. PCT/US2022/029291, Search Report and Written Opinion mailed Sep. 7, 2022, 10 pages.

U.S. Appl. No. 17/373,091, Final Office Action mailed Oct. 6, 2022, 37 pages.

U.S. Appl. No. 17/373,091, Office Action mailed Mar. 3, 2023, 44 pages.

Canadian Patent Application No. 3,164,841, Office Action mailed Jul. 31, 2023, 5 pages.

U.S. Appl. No. 17/373,091, Final Office Action mailed Aug. 7, 2023, 68 pages.

\* cited by examiner

AUTOMATED CLASSIFICATION AND INDEXING OF EVENTS USING MACHINE LEARNING

BACKGROUND

In recent years, a number of events have highlighted the need for increased recordkeeping for law enforcement officers. This need pertains to both evidentiary collection as well as protecting the public from potential abuses by a police officer and protecting the police officer from false accusations of abuse. Law enforcement has previously used various camera devices, such as patrol vehicle cameras and body mounted cameras, as a means of reducing liability and documenting evidence. However, media (e.g., video or images) captured using such camera devices may be reviewed years after the media was captured. The reviewer may not have an exact date or time for certain events that the reviewer may be interested in. This often results in the reviewer having to spend a significant amount of time reviewing unrelated portions of video in order to find and view portions of the video that he or she is interested in viewing.

SUMMARY

Techniques are provided herein for automatically identifying and indexing events within a media content file (e.g., a video or audio file). Media content files may be received at a media processing platform from one or more remote recording devices. Examples of such remote recording devices may include a wearable device (such as a body-mounted camera) or a vehicle-mounted camera. The media processing platform may receive sensor and/or contextual data that corresponds to the received media content file. For example, the media processing platform may receive information obtained from an accelerometer, gyroscope, compass, or other sensor device. The sensor data may be used to identify a context associated with the recording device. Based on one or more patterns determined within the sensor data, and based on the identified context, determining one or more events occurring at a particular time. Once one or more events have been identified, an index may be generated for each of the identified events. Indices may then be appended to (or otherwise associated with) the media content file, such that a viewer can easily locate the associated events within the media content file.

In one embodiment, a method is disclosed as being performed by a media processing platform, the method comprising receiving, from at least one recording device, a media content, receiving sensor data determined to correspond to the media content, determining a context associated with the at least one recording device based on the sensor data, identifying, based on one or more data patterns detected within the sensor data and based on the contextual data, at least one event, generating an index corresponding to the identified event, and storing an indication of the generated index in association with the media content.

An embodiment is directed to a computing device comprising: a processor; and a memory including instructions that, when executed with the processor, cause the computing device to receive, from at least one recording device, a media content, receive sensor data determined to correspond to the media content, determine a context associated with the at least one recording device based on the sensor data, identify, based on one or more data patterns detected within the sensor data and based on the contextual data, at least one event, generate an index corresponding to the identified event, and store an indication of the generated index in association with the media content.

An embodiment is directed to a non-transitory computer-readable media collectively storing computer-executable instructions that upon execution cause one or more computing devices to perform acts comprising receiving, from at least one recording device, a media content, receiving sensor data determined to correspond to the media content, determining a context associated with the at least one recording device based on the sensor data, identifying, based on one or more data patterns detected within the sensor data and based on the contextual data, at least one event, generating an index corresponding to the identified event, and storing an indication of the generated index in association with the media content.

Embodiments of the disclosure provide several advantages over conventional techniques. For example, embodiments of the proposed system provide for automatic identification and indexing of events within media content. This allows an interested party to skip to relevant portions of a video or other media file without having to review the media file in its entirety. Additionally, because events are identified from sensor data that accompanies the media file, the media file can be enhanced to include information/context that would otherwise not be available from simple review of the media file. Furthermore, the system enables portions of a media file to be flagged for review based on a detected event type, eliminating the necessity to review an entire media file, which can be invasive in the case that the media file is generated via a body camera.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that may be used to automatically identify and index events within a media content file that is obtained from a recording device. In some embodiments, sensor and/or contextual data is received in association with the media content file. In some cases, the sensor data may be received from the same recording device that the media content file is received from. In some cases, contextual data may be received from a third-party entity and/or external device and associated with the media content file. The sensor and/or contextual data may be provided to a trained machine learning model in order to identify one or more data patterns that correspond to an event. Upon identifying such an event, an index may be generated that corresponds to the event. The generated index may then be associated with the media content file (e.g., within an event track). An index may be any suitable sign, token, or indication of an event related to a point in time and a media data file.

Figure 1:
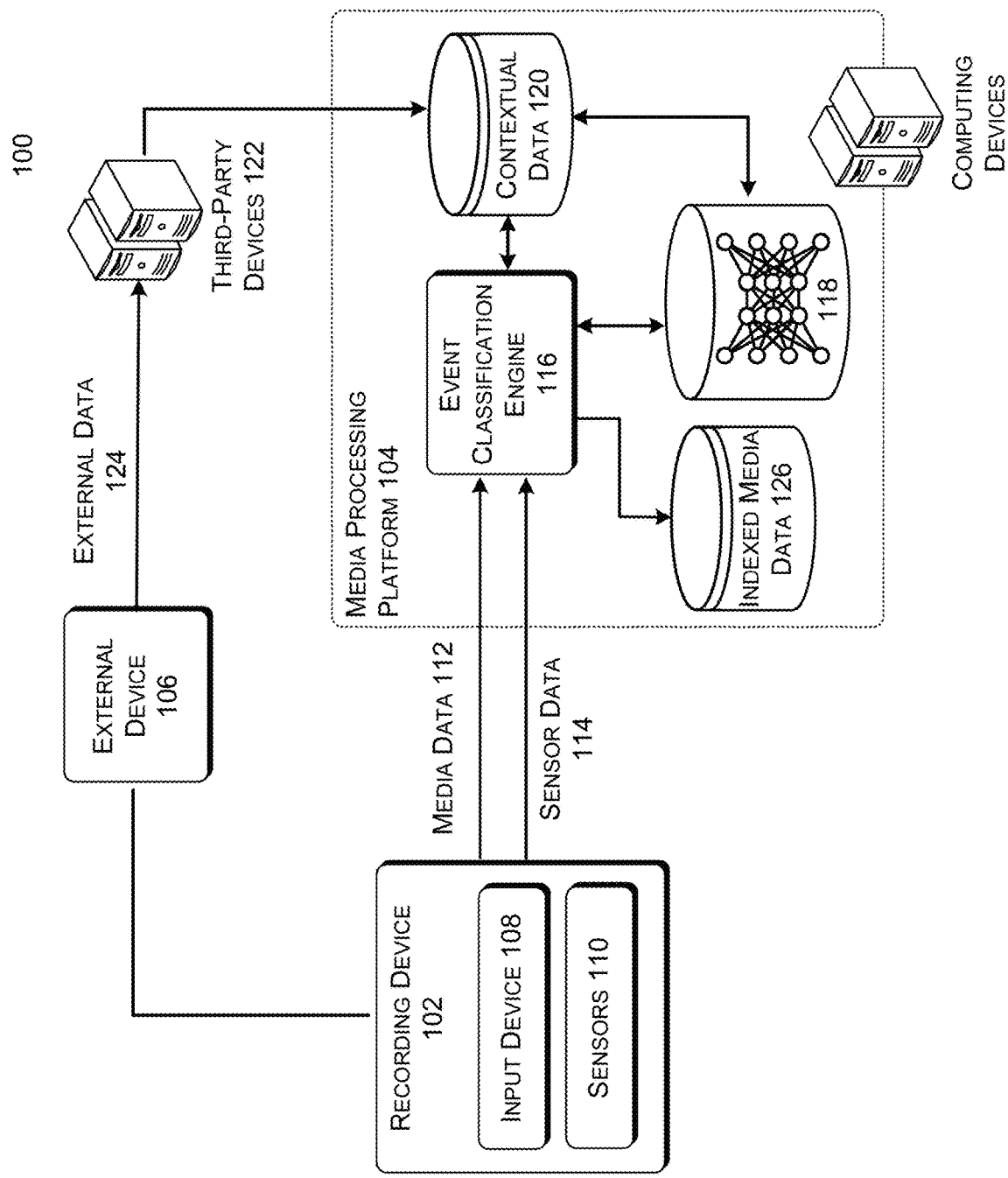
FIG. 1 illustrates an example computing environment configured to receive media content from one or more recording devices and to automatically classify and index events detected within the media content, in accordance with some embodiments.

FIG. 1 illustrates a computing environment configured to receive media content from one or more recording devices and to automatically classify and index events detected within the media content. In FIG. 1, a recording device 102 is configured to communicate with a number of other electronic devices, such as an event classification engine 104 and/or one or more external devices 106.

In the computing environment depicted in FIG. 1, a recording device 102 may comprise any suitable electronic device capable of being used to record information about a person and/or vehicle's surroundings. In some cases, the recording device may be a camera mounted within a vehicle. In some cases, the recording device may be a device that is capable of being worn or otherwise mounted or fastened to a person. The recording device 102 may include at least one input device 108, such as a microphone or camera, and a number of sensors 110 capable of obtaining data about an environment in which the recording device is located. In some embodiments, the number of sensors 110 may include a temperature sensor, a real-time clock (RTC), an inertial measurement unit (IMU), or any other suitable sensor. An IMU may be any electronic device that measures and reports a body's specific force, angular rate, and sometimes the orientation of the body, using a combination of accelerometers, gyroscopes, and magnetometers.

The recording device may be configured to transmit data to the media processing platform 104. More particularly, the recording device may be configured to transmit media data 112 captured by the input device to the media processing platform. Media data 112 may comprise any suitable time series of data samples collected via any suitable sensor. For example, the recording device may be configured to transmit streaming video and/or audio data to the event classification engine. In another example, the recording device may be configured to send still images captured at periodic intervals. In some embodiments, the recording device may be further configured to transmit sensor data 114 captured by the one or more sensors 110 to the event classification engine. Sensor data 114 may include any suitable data collected in relation to environmental factors affecting the recording device. For example, the recording device may transmit information about movements and/or orientations of the recording device to the event classification engine. The sensor data may be transmitted to the event classification engine 112 separately or associated with the media data (e.g., as metadata). Each of the media data and sensor data may include timestamp information that may be used to correlate the two types of data.

The media processing platform 104 can include any computing device configured to perform at least a portion of the operations described herein. Media processing platform 104 may be composed of one or more general purpose computers, specialized server computers (including, by way of example, PC (personal computer) servers, UNIX™ servers, mid-range servers, mainframe computers, rack-mounted servers, etc.), server farms, server clusters, or any other appropriate arrangement and/or combination. Service provider computer 108 can include one or more virtual machines running virtual operating systems, or other computing architectures involving virtualization such as one or more flexible pools of logical storage devices that can be virtualized to maintain virtual storage devices for the computer.

In accordance with at least some embodiments, the media processing platform 104 may maintain a number of components, including an event classification engine 116 capable of categorizing and indexing events and associating an index with a media file in association with the categorized event. The event classification engine 116 may use one or more trained machine learning models 118 to perform such categorization and indexing. In some embodiments, the media processing platform 104 may maintain access to a data store of contextual data 120 that includes information that may be relevant to one or more events identified from a stream of media data. Such contextual data may be received from one or more third-party computing devices 122. For example, the contextual data 120 may include weather information that pertains to various regions. In this example, such weather information may be provided to the media processing platform 104 by a third-party provider of weather information. In some cases, the contextual data 120 may be input to a machine learning model 118 during training and/or during classification of events within media data. In some embodiments, at least a portion of the third-party devices 122 may receive external data 124 from one or more external devices 106. In these embodiments, the third-party device may process the received external data to generate contextual data that is provided to the media processing platform. In some embodiments, the one or more external devices 106 may be in communication with a recording device (e.g., via a short-range communication channel).

For illustration purposes, consider an example in which the recording device is situated within a vehicle (e.g., mounted on a person sitting within the vehicle) that includes an onboard computer. The onboard computer of that vehicle may be in communication with a vehicle onboard computing service provider (i.e., a third-party device). In this example, the vehicle onboard computing service provider may receive information on how fast the vehicle is traveling and in what direction (i.e., a velocity of the vehicle) as well as other information about an environment in which the vehicle is located (e.g., a temperature of the air surrounding the vehicle, a level of precipitation, a grade or degree of incline of a road on which the vehicle is traveling/parked, etc.). This information is then processed by the vehicle onboard computing service provider to generate contextual data for the vehicle that is then provided to the media processing platform. Such contextual data may then be associated with media data received from the recording device situated within that vehicle.

The event classification engine 116 may be configured to identify, based on contextual data and/or sensor data associated with received media data, one or more events within that media data. To do this, the machine learning model 118 may be trained to first determine a context associated with the recording device. Such a context may relate to a situation that currently pertains to the recording device and/or a person operating the recording device. For example, such a context may comprise a determination as to whether the recording device is traveling or stationary, in a particular location or type of location, in a particular state, etc.

Once a context has been determined for the recording device the event classification engine may be configured to correlate patterns of data to particular events. For example, this may comprise identifying particular patterns of movements attributed to the recording device. In another example, this may comprise identifying particular objects or types of objects that are depicted within the received media data 112 (e.g., using one or more object recognition techniques). In another example, this may comprise identifying particular audio cues (e.g., spoken words or phrases) within the media data. Each event may be classified based on a type or category associated with that event. In some embodiments, each event may be assigned a priority level based on its classification. The event classification engine may then generate, for each identified event, an index that corresponds to that event. In some embodiments, the index is appended to the media data itself (e.g., as metadata). In some embodiments, the index is appended to a reference database table or other suitable mapping between the media data and the corresponding identified events. In these embodiments, each event may be mapped to a timestamp within the media data or a range of times during which the event is determined to have occurred.

The media processing platform may store indexed media data within a datastore of indexed media data 126. When such indexed media data 126 is presented to a user, that user may also be presented with an indication of the events identified in relation to the indexed media data 126 as well as a time corresponding to each of those events. For example, upon selecting a video to view, a user may be provided with a list of each of the events determined to be depicted within that video as well as times within the video at which those events occur. In some embodiments, the user may be provided the ability to click on (or otherwise select) a particular event and have the video being playing from a time corresponding to that event.

In some embodiments, communication between one or more components as described with respect to the computing environment 100 can be facilitated via a network. Such a network can include any appropriate network, including an intranet, the Internet, a cellular network, a local area network or any other such network or combination thereof. Components used for such a system can depend at least in part upon the type of network and/or environment selected. Protocols and components for communicating via such a network may be known to one skilled in the art and will not be discussed herein in detail. Communication over the network can be enabled by wired or wireless connections and combinations thereof.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
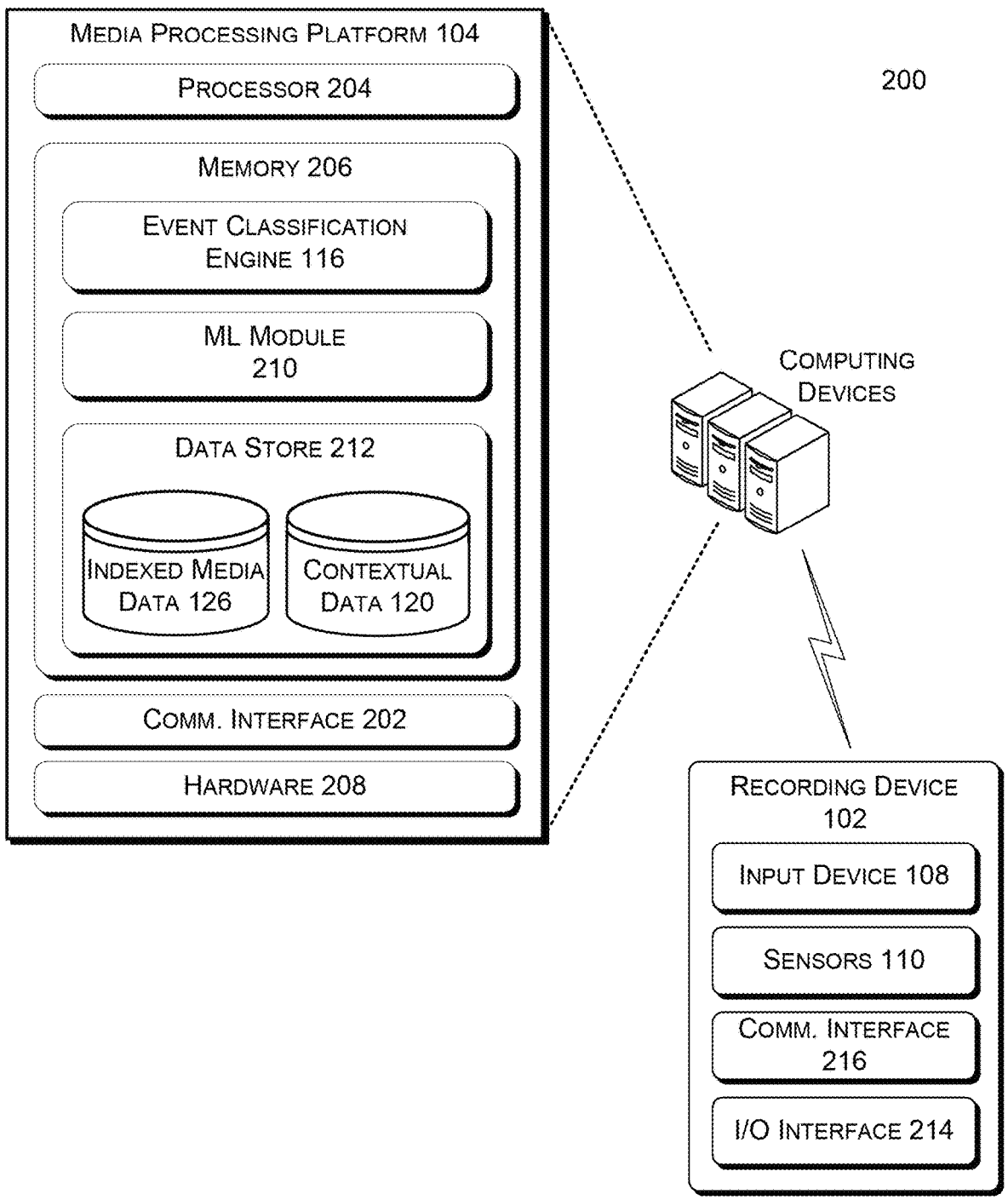
FIG. 2 is a block diagram showing various components of an example computing system architecture that supports a classification and indexing of events within media content in accordance with some embodiments.

FIG. 2 is a block diagram showing various components of a computing system architecture that supports a classification and indexing of events within media content in accordance with some embodiments. The system architecture 200 may include a media processing platform 104 that comprises one or more computing devices. The media processing platform 104 may include a communication interface 202, one or more processors 204, memory 206, and hardware 208. The communication interface 202 may include wireless and/or wired communication components that enable the media processing platform 104 to transmit data to, and receive data from, other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The media processing platform 104 can include any computing device or combination of computing devices configured to perform at least a portion of the operations described herein. The media processing platform 104 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The media processing platform 104 can include one or more virtual machines running virtual operating systems, or other computing architectures involving virtualization such as one or more flexible pools of logical storage devices that can be virtualized to maintain virtual storage devices for the computer. For example, the media processing platform 104 may include virtual computing devices in the form of virtual machines or software containers that are hosted in a cloud.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the media processing platform 104 may implement functionality from one or more software modules and data stores. Such software modules may include routines, program instructions, objects, and/or data structures that are executed by the processors 204 to perform particular tasks or implement particular data types. The memory 206 may include at least a module for detecting and classifying events detected within a media content (e.g., event classification engine 116) as well as a module for training and/or generating a machine learning (ML) model capable of being used to detect such events (ML module 210). Additionally, the memory 206 may further include a data store 212 that contains a number of database tables or other data storage schemas. The data store 212 may include at least a database of media data for which events have been identified and classified (indexed media data 126). In some cases, the data store 212 may further include a database of contextual data 120 received from one or more third-party devices.

The event classification engine 116 may be configured to, in conjunction with the processor 204, identify particular events that occur within a media content and to categorize and index those events. In some embodiments, this comprises receiving media content from a recording device as well as sensor data corresponding to that media content. In some cases, the sensor data may be received from the same recording device and may be correlated to the media content based on that relationship. In some cases, contextual data received from one or more third-party and/or external devices may be correlated to the media content. This correlation may be created based on a date/time for the received contextual data as well as some relationship between the external device and the recording device (e.g., assigned to the same user, located in the same location, in direct short-range wireless communication, etc.). The sensor data and/or contextual data correlated to a particular piece of media content may then be used to identify a context associated with the recording device and/or operator of the recording device.

In some embodiments, a context for a recording device may be identified based on a location, velocity, state, or other suitable attribute of the recording device.

One or more events may then be identified within that media content in light of the identified context. In some cases, events may be detected within a media content upon providing at least a portion of sensor data and/or contextual data correlated with the media content to a trained machine learning model. In such cases, an event may be detected upon determining that values for certain sensor data and/or contextual data have exceeded or fallen below predetermined threshold values. A type or category of the event may also be determined.

In some embodiments, an event may be identified based on data patterns detected within the sensor data as well as when a particular context has been determined to be associated with the recording device and/or operator of the recoding device. For example, given a scenario in which the recording device is being operated by a law enforcement officer, the event classification engine may determine a context for the recording device in which the recording device and its operator are currently located within a police station or authorized firing range. In this example, contextual data may be received from a firearm associated with the recording device indicating that the firearm has been discharged. In this example, the discharge of the firearm is determined to be an authorized firearm discharge event based on its occurrence as well as the determined context. If, however, the context is determined to be that the recording device is not located within a police station or authorized firing range, then the discharge of the firearm is determined to be an unauthorized firearm discharge event based on its occurrence as well as the determined context.

Upon detecting an event associated with a piece of media content, the event classification engine may generate an index for that event. In some embodiments, the index may be stored separate from the media content in a database of index mappings. In some embodiments, the index may be associated with the media content (e.g., as metadata or as a separate track) in a manner that indicates the beginning and/or end of the event within the media content. Once the index has been generated for the event, the media content is stored by the event classification engine within a database of indexed media data. In some embodiments, an index associated with an event may be updated or otherwise adjusted by a user (e.g., an administrator). For example, the user may adjust a begin or end time for the event. In some embodiments, certain generated indices within a media content may be flagged for user review based on a type of event associated with those indices.

The machine learning (ML) module 210 may be configured to, in conjunction with the processor 204, train a machine learning model to be used to identify and categorize events. In some embodiments, this may comprise generating training data in which a user simulates particular events while wearing a recording device. When the training data is provided to the ML module 210, the event may be identified manually in order to facilitate the ML module in correlating one or more patterns detected in the provided data with the event. The ML module may utilize any suitable algorithm for generating an appropriate trained machine learning model. For example, the ML module may use a deep learning algorithm that operates based on artificial neural networks with representation learning. In this example, a trained machine learning model may consist of a number of layers of which each layer includes mathematical relationships between various inputs and outputs for the model. In some embodiments, feedback received in relation to an accuracy of the trained machine learning model is used to adjust that model (e.g., by adjusting variables included within one or more layers of the trained machine learning model).

It should be noted that while the event classification engine 116 is depicted as being included upon a computing device of the media processing platform, this is exemplary only. One skilled in the art would recognize that such a module may be implemented elsewhere to server an equivalent function. For example, the event classification engine may be implemented on a computing device outside of the media processing platform. For example, the event classification engine may be implemented upon an edge computing device that acts as a gateway to a local network. In another example, the event classification engine may be implemented upon a recording device to detect and classify events as media content is obtained. In at least some of these embodiments, a trained machine learning model may be implemented within the recording device to facilitate event classification.

The communication interface 202 may include wireless and/or wired communication components that enable the media processing platform to transmit or receive data via a network, such as the Internet, to a number of other electronic devices (e.g., recording device 102). Such a communication interface 202 may include access to both wired and wireless communication mechanisms. In some cases, the media processing platform transmits data to other electronic devices over a long-range communication channel, such as a data communication channel that uses a mobile communications standard (e.g., long-term evolution (LTE)).

As noted elsewhere, the media processing platform 104 may be in communication with a number of recording devices 102. A recording device 102 may be any suitable electronic device capable of obtaining and recording situational data and that has communication capabilities. The types and/or models of recording device may vary.

A recording device may include one or more input device 108 as well as a number of sensors 110. A input device 108 may include any device capable of obtaining imagery and/or audio. For example, the input device may include a camera device capable of capturing image data and/or a microphone device capable of capturing audio data. In some embodiments, the input device may be configured to capture streaming media (audio and/or video) data to be provided to the media processing platform. In some embodiments, the input device may be configured to capture media, such as still images, at periodic intervals. In some cases, the captured media data may be stored locally on the recording device and uploaded to the media processing platform when a communication channel is established between the two. In some cases, the captured media data may be transmitted to the media processing platform in real-time (e.g., as the media content is captured).

Each recording device may include an input/output (I/O) interface 214 that enables interaction between the recording device and a user (e.g., its wearer). Additionally, the recording device may include a communication interface 216 that enables communication between the recording device and at least one other electronic device (e.g., media processing platform 104 and/or one or more external devices 106). Such a communication interface may include some combination of short-range communication mechanisms and long-range communication mechanisms. For example, the recording device may connect to one or more external devices in its proximity via a short-range communication channel (e.g., Bluetooth®, Bluetooth Low Energy (BLE), WiFi, etc.) and may connect to the media processing platform via a long-range communication channel (e.g., cellular network).

Figure 3:
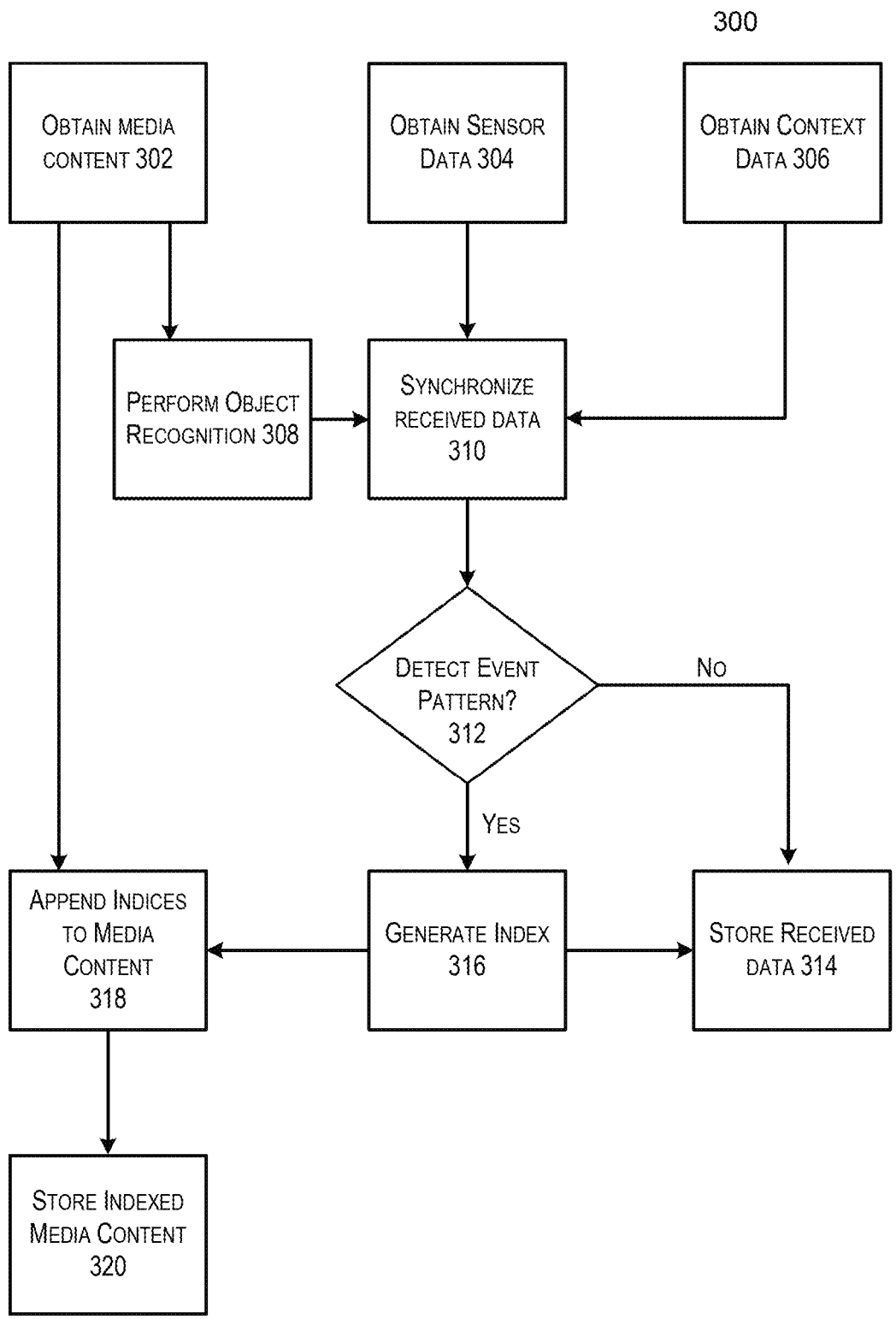
FIG. 3 depicts a block diagram showing an example process flow for identifying and indexing events within media content in accordance with some embodiments.

FIG. 3 depicts a block diagram showing an example process flow for identifying and indexing events within media content in accordance with embodiments. The process 300 involves interactions between various components of the architecture 100 described with respect to FIG. 1. More particularly, the process 300 involves interactions between at least a media processing platform 104 and a recording device 102.

At 302 of the process 300, media content is obtained from a recording device. In some cases, the media content is received from a wearable device capable of being mounted on a person. In some cases, the media content is received from a camera device mounted within a vehicle. The media content may be received as a stream of content in real-time (substantially as the media content is obtained) via a communication channel maintained between the media processing platform and the recording device. Alternatively, the media content may be uploaded all at once at a time subsequent to the collection of the media. For example, at the end of shift, a worker (e.g., a law enforcement officer) may upload a video captured over the course of the shift by his or her wearable recording device to the media processing platform.

At 304 of the process 300, sensor data is obtained by the media processing platform. In some cases, such sensor data is obtained from the same recording device from which the media content is received at 302. For example, the sensor data may include information obtained from a gyroscope, accelerometer, compass or other suitable sensor device installed within the recording device with respect to time. In some cases, such sensor data is received from an external device (e.g., external device 106). For example, the media processing platform may receive an indication from a vehicle that a car door was opened and a time at which the car door was opened. In some embodiments, information received from an external device may be received via the recording device. In the example above, the vehicle may relay the indication that the car door was opened to the recording device, which may then forward that indication to the media processing platform.

In some embodiments, contextual data may be received at 304 of the process 300. Contextual data may include any additional information that can be associated with the obtained media content. In some embodiments, such contextual data may be obtained from a third-party entity (e.g., third-party device 122) and/or external device (e.g., external device 106). In one example, temperature, wind velocity and precipitation information for a particular location may be received from a weather service provider. In another example, video footage may be received from a network of cameras (e.g., traffic cameras or private security cameras).

In some embodiments, contextual data may be associated with a piece of media content. In some cases, contextual data may be associated with media content based on proximity. For example, the media processing platform may receive an indication of a location at which the media content was captured (e.g., via a global positioning system (GPS) device installed within the recording device. In this example, contextual data may be associated with the media content if the indicated location is within some threshold distance of a location associated with the contextual data. In some cases, contextual data may be associated with the media content by virtue of being associated with a common user. For example, media content obtained from a recording device that is assigned to Officer A may be automatically associated with contextual data received from a vehicle that is also assigned to Officer A. In some cases, contextual data may be assigned to media content upon identifying some relationship between the media content and the context. For example, contextual data may include security camera footage obtained from an external camera network. In this example, one or more pattern recognition techniques may be performed to identify a particular person within the received footage. The security footage may then be associated with the media content obtained from a recording device worn by that particular person.

In some embodiments, the process 300 may comprise performing one or more object recognition techniques at 308. For example, a basic object recognition technique may be employed to identify categories of objects that appear within a video file and at what times those respective objects appear within the video. In some embodiments, when an object is determined to be a face, an identification of the owner of that face may be provided.

In some embodiments, the process 300 may comprise synchronizing the received data at 310. It should be noted that the data may be received from a number of different sources and at different times. Accordingly, the data may be received out of sync. For example, some data may be received in real time whereas some data may be provided after its occurrence. The received data may be synchronized based on a timestamp associated with that data.

The process 300 comprises providing the received data to a trained machine learning model. At 312, a determination may be made as to whether one or more patterns of data that correspond to an event can be identified. In the process 300, a machine learning model may have been trained to draw correlations between patterns in sensor and/or contextual data and one or more contexts and events. In some embodiments, multiple machine learning models may be utilized. For example, a first machine learning model may be used to identify a context to be associated with a media data file and a second machine learning model may be used to identify events. In some cases, an administrator or other user may define events that are to be identified during a training process. In some embodiments, the trained machine learning model may determine, based on the provided sensor/contextual data, a likelihood that a particular event has occurred. The event may be detected (i.e., determined to have occurred) if the corresponding likelihood value is greater than a predetermined threshold.

In some embodiments, the process 300 may involve identifying a context associated with the media content. A context associated with the media content may be determined based on one or more factors associated with the media content. For example, a context may be identified based on a location, speed, direction of travel, state, or other factor associated with the media content. Data patterns correlated to events may then be assessed in light of the determined context. In some embodiments, an event may be identified based on data patterns only if a particular context or type of context is determined to be associated with the recording device.

If the trained learning model does not detect any events (e.g., "No" from decision block 312) then the received data may be stored at 314 without generating any indices. However, if the trained learning model determines that an event has occurred (e.g., "Yes" from decision block 314), then the process 300 comprises generating an index at 316. For example, an index may be generated for an event upon determining that the likelihood of that event having occurred is greater than a predetermined threshold. A generated index may include any combination of an event identifier that uniquely identifies the event, an event categorization and/or text, or a timestamp/timestamp range. In some embodiments, an indication of the event may additionally be stored in a separate database (e.g., an event database) along with an indication of the media content to which the index relates.

At 318 of the process 300, one or more generated indices is associated with the media content. In some embodiments, the generated indices are appended to the media content as metadata or within a separate data track. In some embodiments, the generated indices are stored in a database table or other storage medium that is correlated to the media content. At 320 of the process 300, the indexed media content is stored. In some embodiments, the indexed media is stored in a manner that it is accessible to one or more users that wish to play the media content. In some embodiments, the media processing platform may also store an unindexed version of the media content (e.g., for evidentiary purposes).

In some embodiments, one or more users may be notified of the indexed media content. For example, certain events or event categories may be flagged for independent review by a user. In this example, each time that an index is generated that corresponds to one of the events or event categories, a notification may be generated and provided to the user. The user may then be provided the ability to load the indexed portion of the media content that corresponds to the flagged event.

Figure 4:
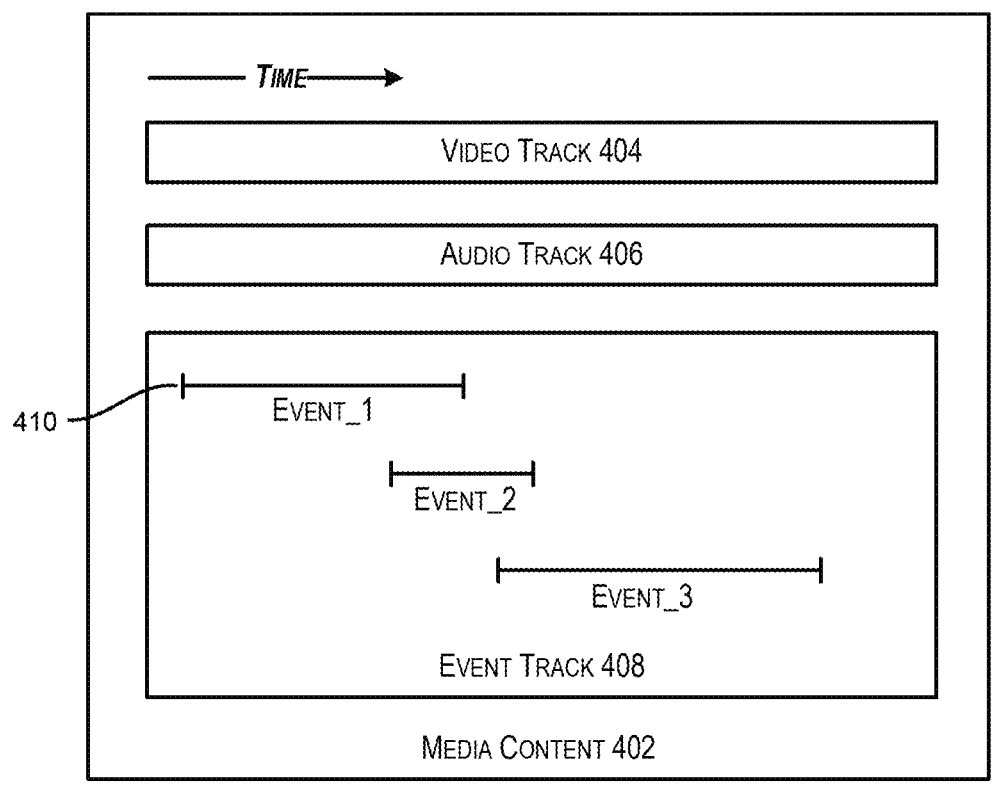
FIG. 4 depicts an example structure diagram for a media content file that may be generated to include indexed events in accordance with some embodiments.

FIG. 4 depicts an example structure diagram for a media content file that may be generated to include indexed events in accordance with at least some embodiments. In some embodiments, a media content file 402 may include a number of tracks, each of which may include different types of data. For example, in the case that the media content file is a video file, that media content file may include at least a video track 404 and an audio track 406. In this example, a video track may include image data with respect to time whereas an audio track may include audio data with respect to time. Each of the tracks within the media content file may be correlated based on timestamps in each of the respective tracks.

A number of indices 410 may be associated with the media content file 402. In some embodiments, such indices for events (e.g., Event_1, Event_2, and Event_3) are appended to the media content within an event track 408 that comprises index data (i.e., indices) with respect to time that correlates to each of the video track and audio track based on timestamps associated with the respective index data.

In some embodiments, the indices included within an event track may include at least text data and timestamp data. In some cases, each of the indices in the index data may include an indication of an event identifier that can be used to identify an event within a database table or other data storage means. In some embodiments, timestamp data stored in event data may include a single timestamp associated with the event. In some embodiments, timestamp data stored in event data may include a range of timestamp data. For example, the indices may include at least a beginning timestamp and an ending timestamp for the event. It should be noted that ranges of timestamp data for the indices in the event track can overlap in that the beginning timestamp for a second event can occur after the beginning timestamp of a first event but before the ending timestamp of the first event.

When the media content file is played using a suitable media player, the event data may be presented to the consumer of the media content along with the data in the other tracks. For example, text associated with the indices may be overlayed onto a video of a video track on a graphical user interface presented via the media player. In some embodiments, a list of indices identified within the event track may be presented to the consumer of the media such that the consumer is able to select one of the indices. Upon selection of an index from the list of indices, the media player may move to a position within the media content that corresponds to the selected index.

Figure 5:
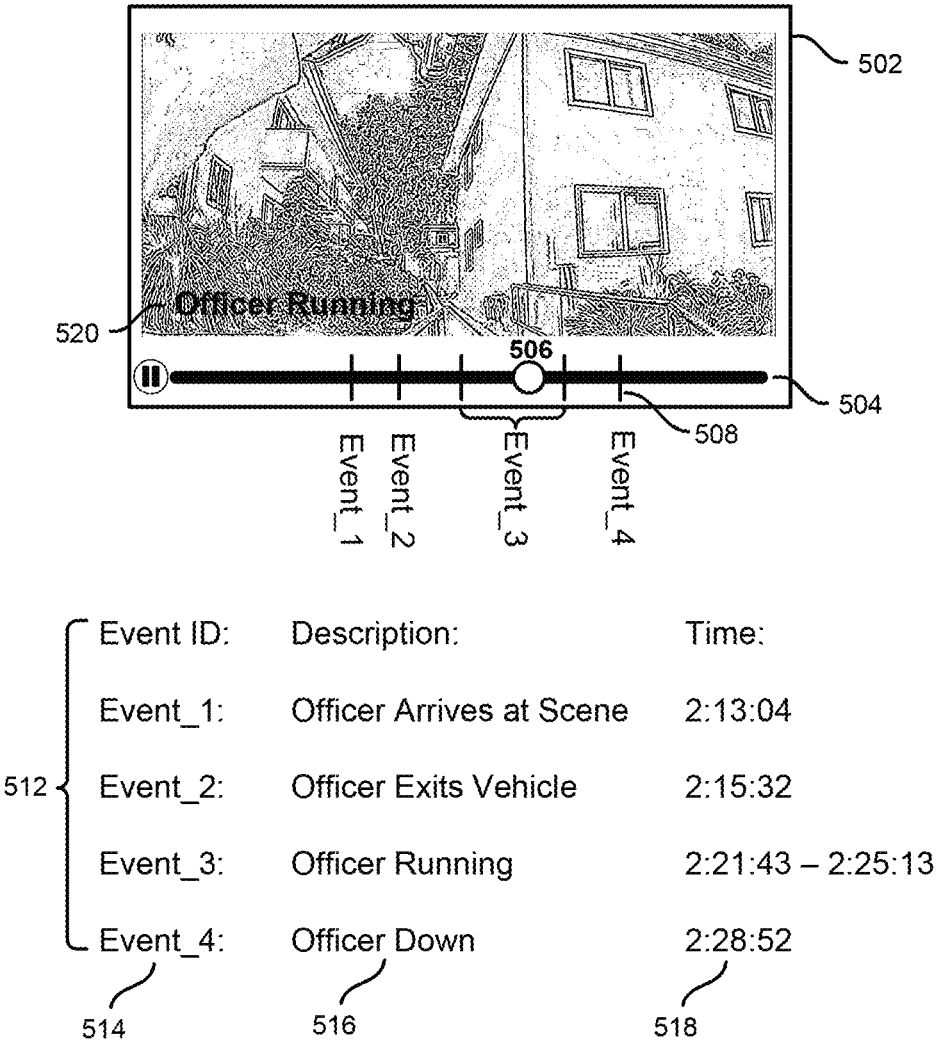
FIG. 5 depicts an example of a graphical representation of one or more interactions that may be undertaken with a media content file that has been indexed with one or more events in accordance with some embodiments.

FIG. 5 depicts an example of a graphical representation of one or more interactions that may be undertaken with a media content file that has been indexed with one or more events in accordance with embodiments. In FIG. 5, a graphical user interface (GUI) 502 is depicted as being presented in association with a media player application. In the depicted example, the media player application is one configured to present video media content.

Each media content file may contain an associated timeline (e.g., a series of timestamps) that is used to synchronize various data tracks included within the media content file. The timeline may be presented via the GUI as a timeline bar 504. A timeline bar may include a position marker 506 that indicates a respective position of the current content within the timeline of the media content file. In some embodiments, a timeline bar may further include a number of time markers 508 that indicate relative positions within the timeline that are associated with indices for different events.

In some embodiments, a media content file may include an event track having indices 512 for a number of events associated with that media content file. As described elsewhere, such indices may be included within a data track of the media content file. In some embodiments, each of the indices may include an event identifier 514 that identifies a particular event, a categorization 516 or description, and a time 518. A categorization for an event may be determined using a trained machine learning model as described elsewhere. In some cases, the time 518 associated with an index may be represented as a single point in time within a timeline included in a media content file. In some cases, the time 518 associated with an index may be represented as a range of times within a timeline included in a media content file.

In some embodiments, at least a portion of the information associated with an index may be presented within a GUI when the media content is played. For example, when a video (i.e., an example media content) is played, such a video may be overlayed with text 520 associated with an index. In some embodiments, the GUI may cause a list of indices associated with the media content to be presented to the user and enable the user to select (e.g., by clicking on) one of the presented indices. In such embodiments, selection of a particular index within the presented list of indices may cause the media player to play a portion of the video associated with that index by skipping to a position within the video timeline that is associated with the index. Such embodiments enable a user to quickly skip to portions of a video that might be relevant to the user's viewing interests without requiring the video to be viewed in its entirety.

Figure 6:
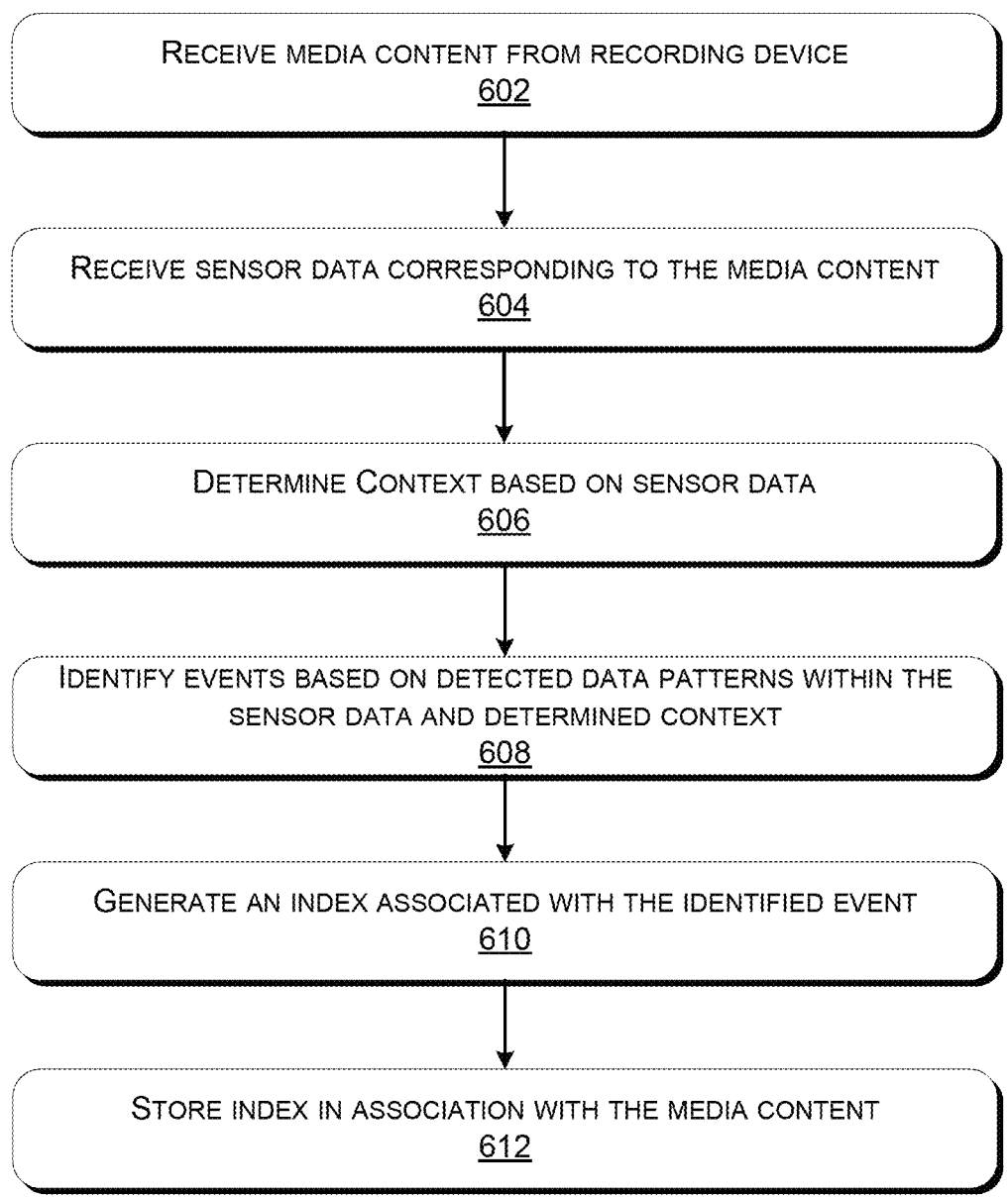
FIG. 6 depicts a block diagram showing an example process flow for automatically identifying and indexing events in a media content in accordance with some embodiments.

FIG. 6 depicts a block diagram showing an example process flow for automatically identifying and indexing events in a media content in accordance with embodiments. The process 600 may be performed by components within a system 100 as discussed with respect to FIG. 1 above. For example, the process 600 may be performed by a media processing platform 104 in communication with a number of recording devices 102.

At 602, the process 600 comprises receiving media content from a recording device. Such media content may comprise at least one of video data or audio data. In some embodiments, the media content is received from the at least one recording device in substantial real-time as streaming data. In some embodiments, the media content is received from the at least one recording device as an upload after the recording device has finished recording.

At 604, the process 600 comprises receiving sensor data corresponding to the media content. In some embodiments, the sensor data is also received from the at least one recording device from which the media content was received. Such sensor data may comprise data obtained from at least one of a gyroscope, accelerometer, compass or any other suitable sensor type.

In some embodiments, the process 600 further comprises receiving contextual data from one or more third-party devices. In some embodiments, at least a portion of the contextual data is obtained by an external device in proximity of the recording device. For example, contextual data may be received from a vehicle in proximity to the recording device or a private security camera network.

At 606, the process 600 comprises determining a context to be associated with the media content. In some embodiments, such a context is determined based on the sensor and/or contextual data received in relation to the media content. In some embodiments, the determined context may relate to a state or condition of the recording device and/or its operator. For example, a context may pertain to whether the recording device and/or its operator is located within a location or type of location. In another example, a context may pertain to whether the recording device is in transit or stationary. In yet another example, a context may pertain to whether or not an operator of the recording device has activated that recording device (e.g., started recording).

At 608, the process 600 comprises identifying one or more events based on detected data patterns within the sensor data. In some embodiments, the one or more data patterns are detected using a trained machine learning model. For example, one or more machine learning algorithms may be used to generate a trained machine learning model by providing an example training set of sensor data that corresponds to known events an input data. In this example, an administrator or other user may manually mark events in a manner that is proved to the machine learning algorithm. The machine learning algorithm then builds correlations between the input data and the output data. By way of illustration, if the machine learning algorithm is a deep neural network, then values stored in various layers of the neural network may be adjusted based on the provided inputs and outputs. Once trained, the trained machine learning model may be provided new sensor data as inputs and will identify an event. In some cases, the trained machine learning model will output a likelihood that patterns exhibited by the input data correspond to an event. This likelihood may be represented by a percentage. In some embodiments, an event may be determined only when a particular context is determined for the recording device.

At 610, the process 600 comprises generating an index associated with the identified one or more events. In some embodiments, the generated index comprises at least one of an event identifier and a timestamp. In some embodiments, the timestamp represents a single point in time. In some embodiments, the timestamp represents a range of times.

At 612, the process 600 comprises storing the generated index in association with the media content. In some embodiments, the indication of the generated index is stored within an event data track of the media content. In at least some of these embodiments, selection of the generated index using a media player causes the media player to play the media content from a particular point on a timeline associated with the media content, the particular point in time corresponding to an occurrence of the event. In some embodiments, the indication of the generated index is stored in a database table being mapped to the media content.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
   receiving, from at least one recording device assigned to a person, a media content;
   receiving sensor data determined to correspond to the media content;
   receiving contextual data that are associated with the media content from a third-party service provider, the contextual data being generated by the third-party service provider based on additional sensor data that is received by an onboard computer of a vehicle assigned to the person and provided by the onboard computer to the third-party service provider;

identifying one or more data patterns of the sensor data and the contextual data, wherein the data patterns are based on one or more of a movement of the recording device, an audio cue of one or more of the sensor data and the contextual data, or a particular object depicted in the sensor data and the contextual data;

correlating the data patterns to at least one event included in the media content;

generating an index corresponding to an identified event of the at least one event, the index comprising at least a begin time for the identified event;

appending the index to the media content, wherein the index is appended to the media content via an event track that is separate from an audio track and video track of the media content; and storing the indexed media content.

2. The method of claim 1, wherein the media content is received from the at least one recording device in substantial real-time as streaming data.

3. The method of claim 1, wherein the media content is received from the at least one recording device as an upload after the recording device has finished recording.

4. The method of claim 1, wherein the media content comprises at least one of video data or audio data.

5. The method of claim 1, wherein the sensor data comprises data obtained from at least one of a gyroscope, accelerometer, or compass.

6. The method of claim 1, wherein an indication of the generated index is stored in a database table that is mapped to the media content.

7. The method of claim 1, further comprising upon determining that the identified event corresponds to a category of event that is flagged for review, providing a notification to at least one user that includes the generated index.

8. A computing device comprising:
a processor;
a memory storing instructions that, when executed with the processor, cause the computing device to, at least:
receive, from at least one recording device, a media content;
receive sensor data determined to correspond to the media content;
determine a context associated with the at least one recording device based on the sensor data;
receive additional contextual data from an external device that is in proximity of a recording device of the at least one recording device and in direct short-range wireless communication with the recording device;
identify one or more data patterns of the sensor data and the contextual data, wherein the data patterns are based on one or more of the sensor data and the contextual data, or a particular object depicted in the sensor data and the contextual data;
correlate the data patterns to at least one event included in the media content;
generate an index corresponding to an identified event of the at least one event;
append the index to the media content, wherein the index is appended to the media content via an event track that is separate from an audio track and video track of the media content, the index for accessing media data in the audio track and the video track that correlates to the identified event; and
store the indexed media content.

9. The computing device of claim 8, wherein the context is determined using a first trained machine learning model and the identified event is identified using a second trained machine learning model.

10. The computing device of claim 8, wherein the additional contextual data includes vehicle data received from an onboard computer of a vehicle.

11. The computing device of claim 10, wherein the additional contextual data includes data received from a firearm that indicates the firearm has been discharged.

12. The computing device of claim 8, wherein the generated index comprises at least one of an event identifier and a timestamp.

13. The computing device of claim 12, wherein the timestamp represents a single point in time.

14. The computing device of claim 12, wherein the timestamp represents a range of times.

15. The computing device of claim 8, wherein the sensor data is received from the at least one recording device.

16. The computing device of claim 8, wherein an indication of the generated index is stored within an event data track of the media content.

17. The computing device of claim 8, wherein selection of the generated index using a media player causes the media player to play the media content from a particular point on a timeline associated with the media content, the particular point in time corresponding to an occurrence of the event.

18. A non-transitory computer-readable media collectively storing computer-executable instructions that upon execution cause one or more computing devices to collectively perform acts comprising:
receiving, from at least one recording device assigned to a person, a media content;
receiving sensor data determined to correspond to the media content;
receiving contextual data that are associated with the media content from a third-party service provider, the contextual data being generated by the third-party service provider based on additional sensor data that is received by an onboard computer of a vehicle assigned to the person and provided by the onboard computer to the third-party service provider;
identifying one or more data patterns of the sensor data and the contextual data, wherein the data patterns are based on one or more of a movement of the recording device, an audio cue of one or more of the sensor data and the contextual data, or a particular object depicted in the sensor data and the contextual data;
correlating the data patterns to at least one event included in the media content;
generating an index corresponding to an identified event of the at least one event, the index comprising at least a begin time for the identified event;
appending the index to the media content, wherein the index is appended to the media content via an event track that is separate from an audio track and video track of the media content; and
storing the indexed media content.

19. The non-transitory computer-readable media of claim 18, wherein the media content is received from the at least one recording device as streaming data.

20. The non-transitory computer-readable media of claim 19, wherein the sensor data is received from the at least one recording device.

* * * * *